United States Patent
Henneken et al.

(10) Patent No.: US 6,879,900 B2
(45) Date of Patent: Apr. 12, 2005

(54) METHOD FOR CONTROLLING AN AUTOMATIC GEARBOX OF A MOTOR VEHICLE IN THE EVENT THAT THE GAS/PEDAL IS SPONTANEOUSLY RELEASED

(75) Inventors: Markus Henneken, Kressbronn (DE); Friedemann Jauch, Meckenbeuren (DE); Franz-Josef Schuler, Kressbronn (DE); Thomas Mauz, Langenargen (DE); Michael Kiefer, Rehlingen-Siersburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 30 days.

(21) Appl. No.: 10/415,038

(22) PCT Filed: Nov. 7, 2001

(86) PCT No.: PCT/EP01/12847

§ 371 (c)(1),
(2), (4) Date: Apr. 22, 2003

(87) PCT Pub. No.: WO02/38987

PCT Pub. Date: May 16, 2002

(65) Prior Publication Data

US 2004/0098181 A1 May 20, 2004

(30) Foreign Application Priority Data

Nov. 11, 2000 (DE) .......................... 100 55 957

(51) Int. Cl.$^7$ .............................................. F16H 61/16
(52) U.S. Cl. ........................................ 701/51; 477/120
(58) Field of Search .............................. 701/51, 55, 56, 701/62, 65; 477/120, 121, 125

(56) References Cited

U.S. PATENT DOCUMENTS

| | | | | |
|---|---|---|---|---|
| 4,258,591 A | * | 3/1981 | Eckert et al. ............... | 477/125 |
| 4,599,917 A | | 7/1986 | Léorat et al. ................. | 74/866 |
| 5,025,684 A | * | 6/1991 | Stehle et al. .................. | 477/62 |
| 5,067,374 A | | 11/1991 | Sakai et al. .................... | 74/866 |
| 5,113,721 A | * | 5/1992 | Polly ............................. | 477/80 |
| 5,436,834 A | | 7/1995 | Graf et al. ................. | 364/424.1 |
| 5,474,505 A | | 12/1995 | Seidel et al. .................. | 477/49 |
| 5,549,519 A | | 8/1996 | Seidel et al. ................ | 477/125 |
| 6,527,672 B1 | * | 3/2003 | Henneken et al. .......... | 477/125 |

FOREIGN PATENT DOCUMENTS

| | | | |
|---|---|---|---|
| DE | 41 20 566 C2 | 4/1995 | .......... F16H/59/24 |
| DE | 198 49 059 A1 | 4/2000 | .......... F16H/59/18 |
| EP | 0 127 507 B1 | 6/1988 | .......... B60K/41/06 |
| EP | 0 375 155 A1 | 6/1990 | .......... F16H/61/02 |
| EP | 0 574 965 A1 | 12/1993 | .......... F16H/61/02 |
| EP | 0 471 102 B1 | 1/1994 | .......... B60K/41/06 |
| FR | 2 737 760 | 2/1997 | .......... F16H/59/04 |

* cited by examiner

Primary Examiner—Michael J. Zanelli
(74) Attorney, Agent, or Firm—Davis & Bujold, P.L.L.C.

(57) ABSTRACT

A method for controlling an automatic transmission of a motor vehicle in the event of a spontaneous gas/pedal release (FastOff). The automatic transmission is driven by an internal combustion engine which can be influenced by an accelerator pedal and a signal proportional to a pedal position is fed to an electronic transmission control in which shifting characteristic field is stored and the spontaneous gas/pedal release (FastOff) is detected and an upshift block (FFO=1) is activated when a pedal position gradient (PSTG) falls below a pedal gradient threshold (KF_PSTG). The mode of the upshift block (FFO=1) is removed when a traction operation is detected when an actual engine torque (MMM) exceeds a push-pull line (KL_ZS) stored as a function of a value equivalent to an engine rotational speed (NMO) in dependence on a vehicle acceleration/deceleration (AIST) dependent on an overall tractional resistance (GFW) and pedal gradient thresholds (KW_PSTGPOS, KW_PSTGNEG).

15 Claims, 1 Drawing Sheet

METHOD FOR CONTROLLING AN AUTOMATIC GEARBOX OF A MOTOR VEHICLE IN THE EVENT THAT THE GAS/PEDAL IS SPONTANEOUSLY RELEASED

FIELD OF THE INVENTION

The invention relates to a method for controlling an automatic transmission of a motor vehicle in the event that the gas/pedal is spontaneously released.

BACKGROUND OF THE INVENTION

As has been known for a long time, modern automatic transmissions in motor vehicles are controlled by an electronic transmission control (EGS) which for automatic selection of a stored shifting program which describes, for example, a known detection of a driver type, a detection of the environment, a detection of a driving situation, or a detection of a manual engagement and for gear selection according to situation communicates with other calculating and control units of different aggregates. The operating points at which the electronic transmission control issues a command for upshifting or downshifting to the hydraulic system, is determined by shifting characteristic lines stored in the electronic transmission control and usually shown as a function of a vehicle velocity and of a position of the accelerator pedal. In older motor vehicles, the position of the accelerator pedal is mechanically detected via a throttle valve position while in modern motor vehicles the accelerator pedal position is detected with "electronic gas".

Life experience teaches that in certain driving situations the guide rod of a motor vehicle quickly removes the foot from the accelerator pedal. In case of a sufficiently high velocity of the vehicle, an upshift to a more economical gear such as from third to fourth gear often takes place. In the coasting operation, the rotational speed of the engine at the same time drops with the upshift.

Such an upshift is obstructive in a required or desired acceleration that follows, since at least one time-consuming downshift has to be carried out in order to make a desired engine input available.

In some driving situations, however, it is not only a reduction in driving comfort that such upshift and subsequent downshift represent, for if this occurs during a brief pedal release or gas release also called "FastOff", it can lead to a danger situation, for example, in case of a discontinued or briefly interrupted overtaking operation since, in the first place, no desired deceleration of the vehicle appears during the "FastOff" and, secondly, the desired rotational speed range with maximum input does not appear, for example, when the overtaking operation is continued.

EP 0 574 965 A1 has disclosed a method for detecting a shift signal from a shift characteristic field with which an upshift of the transmission in the coasting operation has to be prevented and, should that be the case, under high transverse acceleration. To this end is maintained the overrunning of upshift lines of the shift field by the operating point resulting from the momentary vehicle velocity and throttle valve position. The position of the accelerator pedal is measured and, when exceeding the upshift characteristic line, it is converted to an accelerator pedal velocity. The measured value of the accelerator pedal velocity thus obtained is compared with a limiting value stored in the transmission control, an upshift shifting signal is issued when falling below said limiting value. The accelerator pedal velocity is thus a criterion of whether the transmission upshifts. It is further proposed in this method that the upshift operation be suppressed when a transverse acceleration limiting value has been exceeded.

However, this method in which an upshift block is released depending on a negative gradient of the accelerator pedal angle has proved disadvantageous in the practice in the sense that the upshift block is not sensible enough in the case of a brief release of the pedal. It has been found that the upshift block is often introduced too early or too late, or that the driving has been carried out for too long or too short a time at a rotational speed too high for the actual operating situation. Both involve a clear reduction in the driving comfort.

One other method for transmission control has become known from DE 41 20 566 where for activation of the upshift block, in addition to the pedal angle gradient, the criterion "coasting operation" must be detected via a push-pull characteristic line. The mode of the upshift block is left when a "traction operation" is detected and/or a deceleration time has elapsed. But this has proved insufficient for ensuring a correct shifting behavior in the event of spontaneous gas release.

In DE 198 49 059 A1 has been described an improved method in which a spontaneous gas/pedal release (FastOff) is detected and an upshift block is activated when a pedal position gradient is smaller than a pedal position gradient threshold stored in a characteristic field as a function of a pedal position value and of a driver-type evaluation meter. The mode of the upshift block is active until a traction operation is detected when the actual pedal position value exceeds a pull-push characteristic line stored in a characteristic field as a function of a value equivalent to an engine rotational speed and of an acceleration potential value equivalent to a road inclination value.

Complementarily or alternatively, the mode of the upshift block is active until a time has elapsed after a defined time period, the mode of the upshift block being exited after a first period when the pedal position gradient in the first period remains below a positive pedal position gradient threshold and a second period is started when the positive pedal position gradient threshold is overrun and again underrun. The mode of the upshift block after lapse of the second period being exited when the positive pedal position gradient threshold has not again been overrun in the second period.

In this known method, the criteria for the entry and the exit of the "FastOff" function have thus been broadened and made precise. But the standard of fixed time periods always has attached the disadvantage that here the actual vehicle behavior cannot be sufficiently taken into account so that the mode of the upshift block is kept for too short or for an unduly long time, as the case may be.

This invention is based on the problem of making available for control of an automatic transmission of a motor vehicle in the event of a spontaneous gas/pedal release, a method where an upshift block which, after a spontaneous pedal release and a deceleration of the vehicle velocity, allows, as long as it is activated, a great spontaneity for a subsequent acceleration depending on how this fits the driving situation.

SUMMARY OF THE INVENTION

In the inventive method, the exit from the mode of the upshift block after a spontaneous gas/pedal release is advantageously implemented depending on the valuation of the vehicle acceleration/deceleration. This has the advantage that it is possible to dismiss the standard of rigid deceleration times such as known from the prior art, since this is replaced by the change of velocity adapted to the vehicle behavior.

In relation to the prior art, a further improvement is constituted by the detection of a coasting operation or a traction operation based on the actual engine torque instead of via the pedal position. If the engine torque exceeds a characteristic line depending on the engine rotational speed, it can, of course, be assumed with certainty that a coasting operation is present whereas the valuation of the type of driving operation based on the pedal position clearly has great uncertainties. This is specially advantageous in electronic gas where the accelerator pedal is uncoupled from the throttle valve.

By a duration of the mode of the upshift block being dependent on the vehicle acceleration/deceleration, it can be ensured that in case of a spontaneous gas/pedal release a desired vehicle deceleration occurs until the vehicle acceleration/deceleration has reached a value which indicates that the driver intends to change over to a constant speed or that the vehicle should again be substantially accelerated. The vehicle acceleration/deceleration is here stored according to an overall tractional resistance which contains the tractional resistance and the vehicle volume and which for increased accuracy of the inventive method also takes into account environmental conditions such as uphill or down hill driving.

BRIEF DESCRIPTION OF THE DRAWING

The invention will now be described, by way of example, with reference to the accompanying drawing: in which FIG. 1 diagrammatically shows, in a phase diagram, an inventive method for control of an automatic transmission of a motor vehicle in the event of spontaneous gas/pedal release.

DETAILED DESCRIPTION OF THE INVENTION

Figure 1:
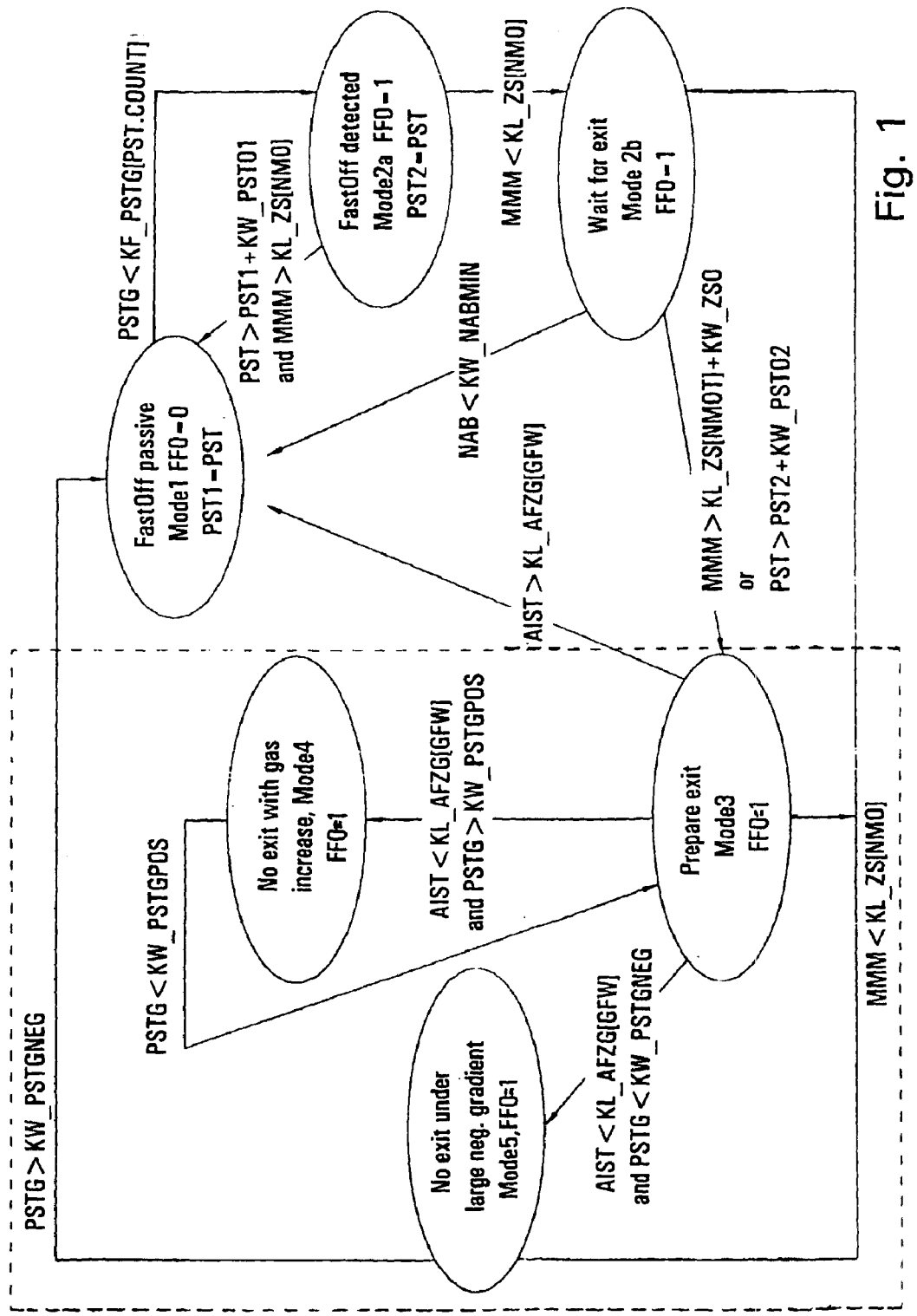

With the control diagrammatically shown in the FIGURE, an automatic transmission is controlled during a spontaneous gas/pedal release which is called "FastOff". The automatic transmission is driven by an internal combustion engine that can be influenced by an accelerator pedal and has an electronic transmission control in which a shifting characteristic field is stored.

The structure of the method is shown in the FIGURE as an automatic mode machine in which one mode is always active. Each time the program is passed through, specific conditions in the relevant mode are examined and when one of said conditions applies, the actual mode is changed in accordance with the condition. If none of the conditions applies, the last mode is again passed through.

For a mode 1 is first defined that no spontaneous gas release or pedal release exists wherefore the mode 1 is designated as a "FastOff passive". The electronic control unit detects in this mode 1 that a variable FFO (Flag FastOff) indicative of the mode of spontaneous pedal release is occupied with "0" and thus unsatisfied. The electronic transmission control, accordingly, also does not issue any command to the upshift block.

In this mode 1 in which the upshift block is not active, an actual pedal position PST is stored as a pedal position value PST1 for the mode 1. Said pedal position value PST can be determined by the electronic control unit from a signal of the throttle valve position fed to it which is proportional to the pedal position, or from a signal of an electronic gas and is used as a starting value for calculating a pedal position gradient PSTG.

In the mode 1 of the inactive upshift block, it is always monitored whether the actual pedal position gradient PSTG is smaller than a pedal gradient threshold KF_PSTG[PST, COUNT]. This pedal position gradient threshold KF_PSTG is stored in a characteristic field as a function of the pedal position value PST and of an evaluation meter of the driver type COUNT which can be of a conventional type, such as known from DE 39 22 051 and DE 196 18 805. With said driver-type evaluation meter COUNT, the sportiveness of the driving behavior is thus also taken into account when detecting a spontaneous gas/pedal release.

When the actual pedal position gradient PSTG does not exceed the pedal position gradient threshold KF_PSTG, the upshift block is started and changed to another state 2a defined in the phase diagram of the FIGURE as "FastOff detected" mode.

In this mode 2a, the electronic transmission control detects the variable in use "FFO=1". In the upshift block now active is tested in the mode 2a whether a traction operation is present while the actual engine torque MMM is upon or over a push-pull characteristic line KL_ZF[NMO] dependent on an engine rotational speed NMO, and the actual pedal position value PST is higher than the pedal position value PST1 when the spontaneous gas/pedal release "FastOff" plus an offset value KW_PSTO1 is detected. Obviously, it is possible here also to examine, instead of the engine rotational speed NMO, a value equivalent to it.

When a traction operation exists and the pedal position is higher than in the starting mode, the mode of the upshift block "FFO=1" is exited and again a change is made to the mode 1 with a deactivated upshift block.

However, in case the actual engine torque MMM is below the push-pull characteristic line KL_ZS[NMO], a coasting operation is detected and a change is made to a mode 2b which, in the phase diagram shown, is defined as mode for "wait for exit". In this mode 2b, the upshift block "FFO=1" is likewise active.

In the mode 2b whether a minimum vehicle velocity has been underrun is examined. This is detected in this case when a transmission output rotational speed NAB is lower than a predefined minimum transmission output rotational speed "KW_NABMIN". In case of falling below the minimum vehicle velocity, the mode of the upshift block is left and return is made to the mode 1 with a deactivated upshift block.

In addition, it is examined in the state 2b whether after gas/pedal release and a subsequent coasting operation, a traction operation again is present.

Such a traction operation is detected, with certainty, when the actual engine torque MMM exceeds the push-pull characteristic line KF_ZS[NMO] plus an offset value KW_ZSO. The offset value KW_ZSO is an applicable variable and serves to balance hysteresis of the engine torque so as to ensure that the engine torque MMM is raised above its limiting value not only for a brief torque but for a range definitively thereabove.

The examination for existence of a traction operation can alternatively be detected also via a distinct increase of the pedal position when the comparison of the actual pedal position value PST with a pedal position PSTO2 plus an offset value KW_PSTO2 stored in the mode 2a "FastOff detected" results in that the actual pedal position value PST is above it.

If the former method sequence is related to real driving behavior, a vehicle on a road during a sport driving mode, for example, has sharpy decelerated as a result of an agricultural machine that is moving ahead, since traffic from the opposite direction does not allow overtaking. The driver thus spontaneously passes from the accelerator pedal and from the "FastOff passive" mode 1 to the "FastOff detected" mode 2a. The vehicle, now approaching the agricultural machine to be overtaken, finds itself in the mode of the upshift block and sharply decelerates, since the vehicle remains in the lower gear provided for the overtaking operation. When in the "wait for exit" mode 2b, a traction operation is now detected, it has to be examined whether a vehicle acceleration/deceleration AIST has reached a value corresponding to a constant speed, that is, that the overtaking operation has ultimately been discontinued, or indicates a distinct acceleration of the vehicle so that it is possible to exit from the upshift block.

To examine whether in case of a clearly detected traction operation one of several criteria, surrounded by dotted lines in the FIGURE, for exit from the mode of upshift block is given, a change is made to a mode 3 defined as mode for "prepare exit". When exiting from the mode of upshift block, three cases are distinguished, the criteria of said three cases being a pedal gradient, threshold and limiting values of the vehicle acceleration/deceleration AIST depending on an overall tractional resistance GFW.

As first must be considered the case that in the "prepare exit" mode 3, it is detected that the vehicle acceleration/deceleration AIST exceeds a threshold KL_AFZG[GFW] stored according to the overall tractional resistance GFW, that is, taking into account the road gradient among others. Should this be the case, the mode 3 is exited and a change is made to the mode 1 of the deactivated upshift block.

There is also the possibility that the vehicle acceleration/deceleration AIST be lower than the preset threshold KL_AFZG[GFW] and the pedal position gradient PSTG exceeds a positive pedal gradient threshold KW_PSTGPOS. In this case, a change is made from the "prepare exit" mode 3 to a mode 4 in which, in spite of a gas increase, the upshift block is still active. If the pedal gradient PSTG again drops below the positive pedal gradient threshold KW_PSTGPOS, a change is made back to the previous "prepare exit" mode 3. This is the case when the pedal gradient PST tends toward lifting of the upshift block but the vehicle behavior still shows no reaction since it accelerates only very slowly, for example, due to an ascent. Only in the case of a clear vehicle acceleration that follows the high pedal gradient PSTG can the upshift block be lifted. In this case the procedure is the same as in the last described case in which the vehicle acceleration/deceleration exceeds the KL_AFZG[GFW]. Threshold.

The two cases discussed above of exiting the upshift block do not prevent desired upshifts during the gas increase and ensure that the exit is not introduced until a constant gas pedal position has been detected with certainty and/or a significant vehicle acceleration exists.

The phase diagram of the FIGURE also shows for the exit from the mode of the upshift lock the case that when traction operation is detected, a second negative pedal gradient threshold KW_PSTNEG is underrun and the vehicle acceleration/deceleration AIST is lower than the threshold AFZG[GFW]. A change is then made to one other mode 5 which, in the phase diagram, is defined "no exit under large negative gradient". Said mode 5 in which the upshift block still is active is not exited until either the pedal gradient PSTG again exceeds the negative pedal gradient threshold KW_PSTNEG when a change is directly made to the "FastOff passive" mode 1 or when coasting operation is detected by the actual engine torque MMM lying below the push-pull characteristic line KL_ZS[NMO] when a change is directly made to the "wait for exit" mode 2b.

This last discussed case of the exit from the upshift block occurs when the driver, after releasing the upshift block, again lightly presses the accelerator pedal, for example, by 30%, and only now is the accelerator pedal completely left. Therefore, if in the "prepare exit" mode 3 the accelerator pedal is quickly released, it is assumed that the driver is going to lift the upshift block.

In every case, return has to be made from the "prepare exit" mode 3 back to the "wait for exit" mode 2b when a coasting operation is detected with the aid of the actual engine torque MMM.

The two positive and negative pedal gradient thresholds KW_PSTGPOS, KW_PSTGNEG used in the two cases last discussed are respectively determined according to the pedal position PST and the driver-type evaluation meter COUNT which, in turn, is determined by a program module of the electronic transmission control for evaluation of the driving behavior.

It is evident that the mode of the upshift block in all the modes described is active only when a maximum engine limiting rotational speed has not been exceeded in order to prevent damage to the engine and/or the transmission.

| References | |
|---|---|
| AIST | vehicle acceleration depending on overall tractional resistance |
| COUNT | driver-type evaluation meter |
| FastOff | spontaneous gas/pedal release |
| FFO | flag for upshift block |
| GFW | overall tractional resistance acceleration potential (mountain detection/tractional resistance) |
| KF_PSTG | pedal gradient threshold, f(PST, COUNT) |
| KL_AFZG | threshold for vehicle acceleration/deceleration |
| KL_ZS | push-pull characteristic line, f(NMO) |
| KW_NABMIN | minimum output rotational speed in FastOff |
| KW_PSTGNEG | negative pedal position gradient threshold |
| KW_PSTGPOS | positive pedal position gradient threshold |
| KW_PSTO1 | offset value to detect with certainty traction operation |
| KW_PSTO2 | offset value to eliminate increase of the pedal position value |
| KW_ZSO | throttle valve offset to exit from FastOff |
| MMM | actual engine torque |
| NAB | transmission output rotational speed |
| NAB_MIN | minimum transmission output rotational speed |
| NMO | engine rotational speed |
| PST | pedal position |
| PST1 | pedal position value, throttle valve value when detecting FastOff |
| PST2 | pedal position value, throttle valve value |
| PSTG | pedal position gradient |

What is claimed is:

1. A method of controlling an automatic transmission of a motor vehicle during a spontaneous accelerator pedal release (FastOff) by a vehicle operator, the method comprising the steps of:

storing at least one shifting characteristic field in an electronic transmission control;

feeding a signal proportional to a position of the accelerator pedal to the electronic transmission control;

detecting the spontaneous accelerator pedal release (FastOff) when a pedal position gradient (PSTG) is smaller than a pedal gradient threshold (KF_PSTG);

and activating an upshift block mode (FFO=1); and exiting the upshift block mode (FFO=1) upon detection of a traction operation when an actual engine torque (MMM) exceeds a push-pull characteristic line (KL_ZS) stored as a function of a value equivalent to an engine rotational speed (NMO) depending on a vehicle acceleration/deceleration (AIST) relative to an overall tractional resistance (GFW) and the pedal gradient threshold (KW_PSTGPOS, KW_PSTGNEG).

2. The method according to claim 1, further comprising the step of exiting the upshift block mode (FFO=1) when the traction operation is detected and an actual pedal position value (PST) is higher than a pedal position value (PST1) when detecting the spontaneous accelerator release (FastOff) plus an offset value (KW_PSTO1).

3. The method according to claim 1, further comprising the step of exiting the upshift block mode (FFO=1) when a minimum vehicle velocity is underrun.

4. The method according to claim 1, further comprising the step of exiting the upshift block mode (FFO=1) when, during the detected traction operation, the vehicle acceleration/deceleration (AIST) is higher than a threshold (KL_AFZG) stored in a characteristic line depending on at least one of overall tractional resistance (GFW) and an at least almost constant pedal position is detected.

5. The method according to claim 1, further comprising the step of exiting the upshift block mode (FFO=1) when during the detected traction operation a negative pedal gradient threshold (KW_PSTGNEG) is first underrun and then overrun.

6. The method according to claim 1, further comprising the step of, after detection of a spontaneous accelerator release (FastOff) and of a subsequent coasting operation, changing from a "wait for exit" mode to a "prepare exit" mode when the traction operation is detected by the actual engine torque (MMM) being upon or above a push-pull characteristic line (KL_ZS) depending on the engine rotational speed (NMO) plus an offset value (KW_ZSO).

7. The method according to claim 6, further comprising the step of returning from a "prepare exit" mode to a "wait for exit" mode when a coasting operation is again detected by the actual engine torque (MMM) lying below the push-pull line (KL_ZS) when the upshift block mode (FFO=1) is activated.

8. The method according to claim 1, further comprising the step of, after detection of a spontaneous accelerator release (FastOff) and a subsequent coasting operation, changing from a "wait for exit" mode to a "prepare exit" mode when the actual pedal position value (PST) is higher than the pedal position value (PST2) at a moment of the spontaneous accelerator release (FastOff) plus an offset value (KW_PSTO2).

9. The method according to claim 1, further comprising the step of allowing the upshift block mode (FFO=1) to remain active when the vehicle acceleration/deceleration (AIST) is lower than a threshold (KL_AFZF) stored depending on the overall tractional resistance (GFW) while a positive pedal position gradient threshold (KW_PSTGPOS) is exceeded.

10. The method according to claim 9, further comprising the step of branching off from a prepare exit mode when the pedal gradient (PSTG) again falls below the positive pedal gradient threshold (KW_PSTGPOS).

11. The method according to claim 1, further comprising the steps of allowing the upshift block mode (FFO=1) to remain active when the vehicle acceleration/deceleration (AIST) is lower than the threshold (KL_AFZG) stored depending on the overall tractional resistance (GFW) while a negative pedal gradient threshold (KW_PSTGNEG) is underrun, and exiting the mode of the upshift block mode (FFO=1) upon exceeding the negative pedal gradient threshold (KW_PSTGNEG).

12. The method according to claim 1, further comprising the step of determining one of a positive and a negative pedal position gradient threshold (KW_PSTGPOS, KW_PSTGNET) depending on the pedal position (PST) and a driver-type evaluation meter COUNT.

13. The method according to claim 1, further comprising the step of storing the pedal gradient threshold (KF_PSTG) in a characteristic field as a function of a pedal position value (PST) and of a driver-type evaluation meter COUNT.

14. The method according to claim 1, further comprising the step of determining quantities of a driver-type evaluation meter (COUNT) in a program module of the electronic transmission control which evaluates driving behavior.

15. The method according to claim 1, further comprising the step of deactivating the upshift block mode (FFO=1) upon exceeding the maximum engine rotational speed (NMO_MAX).

* * * * *